May 24, 1949.                C. H. MOSHER                2,470,940
                              PIPE CLEANER
                       Original Filed Feb. 19, 1944

INVENTOR.
CLARENCE H. MOSHER
BY White & Riaboff
ATTORNEYS

Patented May 24, 1949

2,470,940

UNITED STATES PATENT OFFICE 2,470,940

PIPE CLEANER

Clarence H. Mosher, Sacramento County, Calif.

Substituted for abandoned application Serial No. 523,149, February 19, 1944. This application April 25, 1947, Serial No. 743,863

2 Claims. (Cl. 285—211)

The present invention, which is a substitute for an abandoned application No. 523,149, filed February 19, 1944, relates to improvements in pipe cleaners and its principal object is to provide a cleaner for a smoking pipe whereby the bowl and the stem of the pipe may be cleaned conveniently in a simple operation.

More particularly it is proposed to utilize for this purpose water discharged from a suitable source, such as the city water supply, through a suitable faucet under pressure, by forcing the water through the bowl and the stem of the pipe, the water being preferably in a heated condition.

For this purpose it is proposed to provide a suitable coupling or adapter which may be readily attached to a faucet and which furnishes a sealing means to hold the bowl of the pipe against, so that the bowl and the stem of the pipe are made to form a continuous passage with the faucet and the water may be forced through the pipe without spurting or sputtering around the rim of the bowl.

It is further proposed to provide, in combination with the adapter or coupling, means for guiding the bowl of the pipe toward the sealing means which also aid the operator in firmly holding the bowl of the pipe against the coupling in properly centered position.

Further objects and advantages of my invention will appear as the specification proceeds.

The preferred forms of my invention are illustrated in the accompanying drawing in which Fig. 1 is a side elevation of a coupling or adapter.

While I have shown only the preferred forms of the invention, I wish to have it understood that various changes and modifications may be made within the scope of the claims hereto attached without departing from the spirit of the invention.

Figure 1:
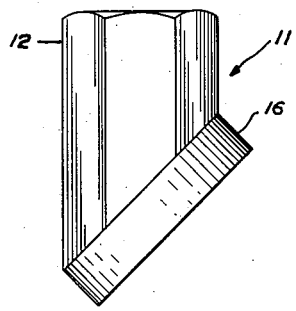
Figure 2:
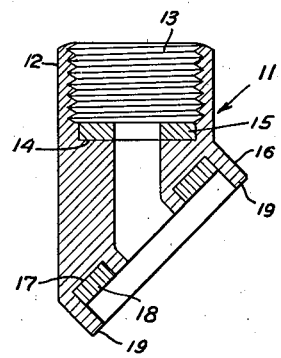
Fig. 2 is a vertical section through the same.
Figure 3:
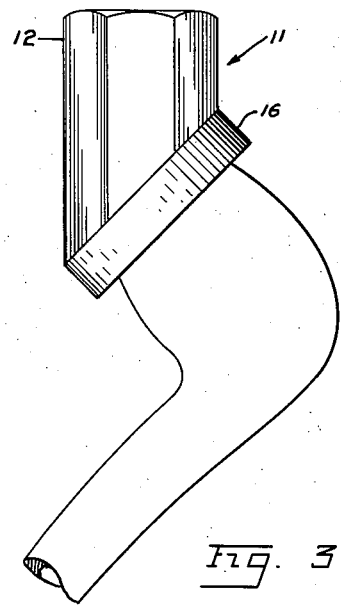
Fig. 3 is a side elevation showing the bowl of a pipe applied to said coupling or adapter.

Referring to the drawing in detail, my coupling, indicated generally as 11, is made of one piece and is constructed to present the washer or sealing medium against which the bowl of the pipe is held at an angle to the end of the faucet. This allows the pipe to be held at a corresponding angle, as illustrated in Figure 3, and to discharge from the pipe stem into a tray underneath the faucet.

This coupling is made in the form of an elbow, presenting a vertical end 12 formed with a screw thread 13 adapted for threading on a faucet, and a shoulder 14 adapted to receive the washer 15. Its lower end 16 forms an angle with the upper end and has an annular groove 17 in the wall thereof to receive the washer 18 against which the bowl of the pipe is held. The outer rim 19 of the wall formed by the groove is preferably longer than the inner rim to form a guide and centering means for the bowl of the pipe.

The manner of using my invention will be readily understood from the foregoing description. The coupling is screwed upon a faucet having a threaded end and the bowl of the pipe is held firmly against the washer at the outer end of the coupling. The faucet is then opened and the full pressure behind the faucet is used for forcing the water through the pipe bowl and the pipe stem.

It is apparent that where the faucet to be used does not have any threaded end, any other suitable means may be used for securing the coupling upon the faucet.

I claim:

1. A pipe cleaner of the character described, comprising a sleeve adapted for fastening upon the discharge end of a faucet and having a shoulder adapted to receive a washer for bearing upon the faucet, an angular extension of the sleeve having a groove in the end wall thereof, and a washer disposed in the groove and adapted to have the bowl of a pipe bear thereagainst.

2. A pipe cleaner comprising a sleeve adapted for fastening upon the discharge end of a faucet and having a shoulder in the upper end thereof, a washer resting in said shoulder for bearing upon the faucet; an angular extension of the sleeve having annular groove in the end, said groove being formed between inner and outer rims, the latter being longer than the first; a washer retained in said groove and adapted to have the bowl of a pipe bear thereagainst.

CLARENCE H. MOSHER.

REFERENCES CITED

The following references are of record in the file of this patent:

UNITED STATES PATENTS

| Number | Name | Date |
|---|---|---|
| 1,062,695 | Cornelius | May 27, 1913 |
| 1,647,324 | Waggoner | Nov. 1, 1927 |
| 1,702,322 | Snowdon | Feb. 19, 1929 |